United States Patent [19]

Perchenek

[11] Patent Number: 5,552,356
[45] Date of Patent: Sep. 3, 1996

[54] BORON SUBPHOSPHIDE/ALUMINUM OXIDE COMPOSITE MATERIALS, PROCESSES FOR THE PRODUCTION THEREOF AND USE THEREOF

[75] Inventor: Nils Perchenek, Leverkusen, Germany

[73] Assignee: Bayer AG, Leverkusen, Germany

[21] Appl. No.: 496,315

[22] Filed: Jun. 29, 1995

[30] Foreign Application Priority Data

Jul. 11, 1994 [DE] Germany .......................... 44 24 402.9

[51] Int. Cl.$^6$ .......................... C04B 35/10; C04B 38/00; C04B 38/06
[52] U.S. Cl. .......................... 501/153; 501/127; 501/80
[58] Field of Search .......................... 501/127, 153, 501/80

[56] References Cited

U.S. PATENT DOCUMENTS

| | | | |
|---|---|---|---|
| 4,595,559 | 6/1986 | Planchamp | 420/528 |
| 4,891,337 | 1/1990 | Logan | 501/80 |
| 5,190,899 | 3/1993 | Sutor | 501/127 |
| 5,413,974 | 5/1995 | Yokoyama et al. | 501/153 |

FOREIGN PATENT DOCUMENTS

| | | |
|---|---|---|
| 0504786 | 9/1992 | European Pat. Off. . |
| WO85/01044 | 3/1985 | WIPO . |

*Primary Examiner*—Mark L. Bell
*Assistant Examiner*—Louis M. Troilo
*Attorney, Agent, or Firm*—Connolly & Hutz

[57] ABSTRACT

The present invention relates to boron subphosphide/aluminum oxide composite materials, to processes for the production of these materials and to the use thereof.

20 Claims, No Drawings

BORON SUBPHOSPHIDE/ALUMINUM OXIDE COMPOSITE MATERIALS, PROCESSES FOR THE PRODUCTION THEREOF AND USE THEREOF

The present invention relates to boron subphosphide/aluminum oxide composite materials, to processes for the production of these materials and to the use thereof.

It is possible by combining aluminum oxide with other ceramic hard materials to obtain composite materials which often have superior mechanical properties to those of the individual components. Many compounds are used in these composite materials, generally from the series comprising carbides, borides, nitrides or silicides (EP-A 0 571 866). Examples are composite materials of $Al_2O_3$ with $TiB_2$, $B_4C$, SiC, TiC, TaC, WC, TiCN, CBN, $Si_3N_4$ and others. Each of these materials may be used in certain applications and is less suitable in other cases. Frequently, for example, hardness or toughness are too low, the bond between the components is not optimal or the costs of the material are too high.

The object of the invention is thus to provide novel composite materials which may be used as hard materials as well as processes for the simple and economic production of these materials.

These requirements are fulfilled by the following novel materials, which are provided by the present invention. These are composite materials made from aluminum oxide and phosphides of the general formula $B_{12+x}Al_yP_{2-z}$, wherein the following applies: $0 \leq x \leq 1$, $0 \leq y \leq 1$, $0 \leq z \leq (x+y)$. In a preferred case, y equals 0. In this case, the compounds are binary boron subphosphides, which exhibit particularly elevated hardness. Depending upon their composition, the compounds $B_{12+x}Al_yP_{2-z}$ exhibit Vickers hardnesses in the range from 33 to 36 GPa, which are surpassed only by substances such as CBN and diamond. When combined with aluminum oxide, they increase the hardness of this compound considerably. They may also be very readily incorporated into aluminum oxide.

In a preferred embodiment, the proportion of aluminum oxide in the composite materials according to the invention is between 4 and 99.9 wt. %, particularly preferably between 40 and 99 wt. %, as in this case a continuous aluminum oxide matrix enclosing the particles of the component containing boron may be formed, which results in increased strength of the composite material.

It is preferred to produce materials in which the particles of $B_{12+x}Al_yP_{2-z}$ are homogeneously distributed in the aluminum oxide matrix; however, by means of suitable processes, it is also possible to produce materials in which zones with a homogeneous distribution alternate with bands or layers of pure aluminum oxide.

The present invention also provides processes for the production of the composite materials according to the invention.

The composite materials according to the invention may be particularly elegantly and economically produced by aluminothermic reduction of boron phosphate $BPO_4$. The composite material is then produced in situ. The proportion of aluminum in the product mixture has to be at least sufficient to completely bind the oxygen contained in the boron phosphate, which is the case in a binary mixture with an aluminum content of 40 wt. % or more. The excess phosphorus escapes in gaseous form during the reaction. In order to avoid this, it is convenient to use powder mixtures of boron phosphate, boron and aluminum as starting materials for the reduction. In order to completely bind the oxygen contained in the boron phosphate, the weight ratio of boron phosphate to aluminum must be less than 1.5. Preferably, mixtures are used which are calculated to the stoichiometry of the desired $B_{12+x}Al_yP_{2-z}$ compound. The ratio of aluminum oxide and boron compound in the reaction product may be influenced by adding aluminum oxide or $B_{12+x}Al_yP_{2-z}$ to the mixture of starting materials. The rate and temperature of the reaction may also be controlled by these additions.

In order to perform the reaction, the mixture of starting materials is used either as a powder bed or in compacted form. The mixture is then preferably ignited, as the reaction is self-maintaining due to its highly exothermic nature and proceeds to completion within a very short time. Ignition may proceed by rapidly heating the entire batch in a furnace or also locally by means of electrical igniters, flames, ignition mixtures or other methods familiar to the person skilled in the art. Due to the elevated heat of reaction, most of the impurities contained in the starting materials are vaporised. Consequently their content in the product is distinctly reduced. Due to the evolution of gas, but also due to the increase in volume occurring during the reaction, which is caused by the higher density of the composite material according to the invention compared with the starting materials, the reaction product obtained is generally a porous material, from which compact articles may be obtained by grinding and subsequent sintering.

In a preferred embodiment, the process is performed in such a manner that the heat produced in the reaction is sufficient to keep the aluminum oxide liquid until after the gases formed during the reaction have escaped. In this manner, a product of distinctly lower porosity is obtained, which may directly be comminuted to grain sizes suitable for abrasive applications.

The composite materials according to the invention may also be produced from powder mixtures of aluminum oxide and $B_{12+x}Al_yP_{2-z}$. To this end, in a preferred embodiment, powder mixtures of the starting materials are sintered at temperatures of above 1,800° C., in a particularly preferred embodiment of above 2,050° C., as at these temperatures the aluminum oxide matrix is present in molten form.

The present invention also provides the use of the ternary composite materials according to the invention as abrasive grains in abrasive materials.

The invention is illustrated below by way of example, without the invention being limited thereto.

EXAMPLE 1

50 g of boron phosphate, 25.6 g of amorphous boron and 34 g of aluminum powder were suspended in 140 ml of 2-propanol and mixed in an attritor with corundum balls at 1,000 rpm for two hours. After removal of the solvent, the resultant mixture was dried at 130° C. Compacts were produced from the mixture of starting materials under an isostatic pressure of 2 kbar. These were clamped between two copper electrodes and ignited by applying an AC voltage of approximately 40 V. The compact expands distinctly during the very vigorous reaction. A spongy, porous structure was found on examination with a light microscope. The particles of $B_{12+x}Al_yP_{2-z}$, which are of an average size of approximately 1 pm, are homogeneously distributed in the aluminum oxide matrix. Only corundum and $B_{13}P_2$ were identified from an X-ray diffraction diagram.

EXAMPLE 2

50 g of boron phosphate, 28.1 g of amorphous boron and 34 g of aluminum powder were suspended in 140 ml of 2-propanol and mixed in an attritor with corundum balls at 1,000 rpm for two hours. The solvent was removed and the residue dried at 130° C. The resultant powder mixture was pressed into a compact under a uniaxial pressure of 1 kbar. This compact was insulated with rock wool in order to reduce heat losses during the reaction and ignited in a reaction vessel purged with argon using a mixture of $KMnO_4$ and glycerol. After the reaction, the test specimen had a laminar, slate-like internal structure; areas with a homogeneous distribution of $B_{12+x}Al_yP_{2-z}$ and aluminum oxide were principally identified on examination with a light microscope. The Vickers hardness of the material in these areas, measured under a test load of 2 N, was found to be 30 GPa. Additionally banded or lamellar zones of pure aluminum oxide were found. By means of careful grinding, it was possible to obtain compact grains with diameters of up to 0.7 mm.

EXAMPLE 3

10 g of boron phosphate, 5.1 g of amorphous boron, 6.8 g of aluminum powder and 1 g of aluminum oxide powder were suspended in 100 ml of 2-propanol. The mixture was heated to boiling and the solvent distilled off; the residue was dried at 130° C. Compacts were produced from the resultant powder mixture under an isostatic pressure of 2 kbar. These were transferred into an argon-purged tubular furnace preheated to 800° C. After approximately 60 seconds, the compact lighted up very brightly. After the reaction, the compact had swollen distinctly along the longitudinal axis and had a structure like a fine cone.

Examination under a light microscope showed that the aluminum oxide added to the mixture of starting materials had been melted during the reaction.

EXAMPLE 4

5.0 g of $B_{12}Al_{0.3}P_{1.7}$ and 5.0 g of aluminum oxide powder were suspended in 50 ml of 2-propanol and ground with iron balls for two hours at 300 rpm in a planetary ball mill. The resultant mixture was treated with aqueous hydrochloric acid to remove abraded material from the grinding balls and then dried at 130° C. Compacts were produced from the resultant powder mixture under an isostatic pressure of 8 kbar. These were heated to 2100° C. for 15 min in Argon atmosphere. Compact test specimens with a homogeneous distribution of $B_{12}Al_{0.3}P_{1.7}$ and aluminum oxide were obtained, in which no pores were found, on examination under a light microscope at 1,000× magnification and with which SiC could be scratched.

I claim:

1. Ceramic composite materials, consisting essentially of aluminum oxide and compounds of the general composition $B_{12+x}Al_yP_{2-z}$, wherein $0 \leq x \leq 1$, $0 \leq y \leq 1$ and $0 \leq z \leq (x+y)$.

2. Ceramic composite materials according to claim 1, wherein y equals 0.

3. Ceramic composite materials according to claim 1, wherein the amount of aluminum oxide in said ceramic composite material is between 4 and 99.9 wt. %.

4. Ceramic composite materials according to claim 1, wherein the amount of aluminum oxide in said ceramic composite material is between 40 and 99 wt. %.

5. Ceramic composite materials according to claim 1, wherein particles of $B_{12+x}Al_yP_{2-z}$, where $0 \leq x \leq 1$, $0 \leq y \leq 1$ and $0 \leq z \leq (x+y)$, are homogeneously distributed in a matrix of aluminum oxide.

6. A process for the production of ceramic composite materials consisting essentially of aluminum oxide and compounds of the general composition $B_{12+x}Al_yP_{2-z}$, wherein $0 \leq x \leq 1$, $0 \leq y \leq 1$, and $0 \leq z \leq (x+y)$, said process comprising the steps:
   a) preparing a reactant mixture containing boron phosphate and aluminum in which the weight ratio of boron phosphate to aluminum is less than 1.5; and
   b) igniting said mixture to initiate a redox reaction in which the composite material is formed.

7. The process of claim 6, wherein the reactant mixture additionally contains aluminum oxide or $B_{12+x}Al_yP_{2-z}$, wherein $0 \leq x \leq 1$, $0 \leq y \leq 1$, and $0 \leq z \leq (x+y)$.

8. A process for the production of ceramic composite materials consisting essentially of aluminum oxide and compounds of the general composition $B_{12+x}Al_yP_{2-z}$, wherein $0 \leq x \leq 1$, $0 \leq y \leq 1$, and $0 \leq z \leq (x+y)$, said process comprising the steps:
   a) preparing a reactant mixture containing boron phosphate, boron and aluminum, in which the weight ratio of boron phosphate to aluminum is less than 1.5; and
   b) igniting said mixture to initiate a redox reaction in which the composite material is formed.

9. The process of claim 8, wherein the boron phosphate, boron and aluminum are used in a stoichiometric ratio for the formation of $B_{12+x}Al_yP_{2-z}$, wherein $0 \leq x \leq 1$, $0 \leq y \leq 1$, and $0 \leq z \leq (x+y)$.

10. The process of claim 8, wherein the reactant mixture additionally contains aluminum oxide or $B_{12+x}Al_yP_{2-z}$, wherein $0 \leq x \leq 1$, $0 \leq y \leq 1$, and $0 \leq z \leq (x+y)$.

11. A process for the production of ceramic composite materials consisting essentially of aluminum oxide and compounds of the general composition $B_{12+x}Al_yP_{2-z}$, wherein $0 \leq x \leq 1$, $0 \leq y \leq 1$, and $0 \leq z \leq (x+y)$, said process comprising the steps:
   a) preparing a mixture of aluminum oxide and $B_{12+x}Al_yP_{2-z}$, wherein $0 \leq x \leq 1$, $0 \leq y \leq 1$, and $0 \leq z \leq (x+y)$; and
   b) sintering said mixture at a temperature which is above 1,800° C.

12. The process of claim 11, wherein the mixture is sintered at temperatures of above 2,050° C.

13. A method of using ceramic composite materials consisting essentially of aluminum oxide and compounds of the general composition $B_{12+x}Al_yP_{2-z}$, wherein $0 \leq x \leq 1$, $0 \leq y \leq 1$, and $0 \leq z \leq (x+y)$, said method comprising the step of comminuting the ceramic composite materials to form abrasive grains.

14. The method of claim 13, wherein the method further comprises the step of bonding the abrasive grains together or to a substrate to form an abrasive article.

15. The process of claim 6, wherein said process consists essentially of the following steps:
   a) preparing a mixture containing boron phosphate, aluminum and a liquid, in which the weight ratio of boron phosphate to aluminum is less than 1.5;
   b) removing the liquid to form a reactant mixture;
   c) drying the reactant mixture;
   d) compacting the reactant mixture to form a compact;
   e) igniting the compact to initiate a redox reaction in which the ceramic composite material is formed.

16. The process of claim 7, wherein said process consists essentially of the following steps:
   a) preparing a mixture containing boron phosphate, aluminum, boron and a liquid in which the weight ratio of boron phosphate to aluminum is less than 1.5;

b) removing the liquid to form a reactant mixture;

c) drying the reactant mixture;

d) compacting the reactant mixture to form a compact;

e) igniting the compact to initiate a redox reaction in which the ceramic composite material is formed.

17. The process of claim 11, wherein said process consists essentially of the following steps:

a) preparing a mixture containing aluminum oxide, $B_{12+x}Al_yP_{2-z}$, wherein $0 \leq x \leq 1$, $0 \leq y \leq 1$, and $0 \leq z \leq (x+y)$, and a liquid;

b) removing the liquid to form a sintering mixture;

c) drying the sintering mixture;

d) compacting the sintering mixture to form a compact;

e) sintering said compact at temperatures above 1,800° C. to form said ceramic composite material.

18. The process of claim 15, wherein said liquid is 2-propanol.

19. The process of claim 16, wherein said liquid is 2-propanol.

20. The process of claim 17, wherein said liquid is 2-propanol.

* * * * *

UNITED STATES PATENT AND TRADEMARK OFFICE
CERTIFICATE OF CORRECTION

PATENT NO. : 5,552,356
DATED : September 3, 1996
INVENTOR(S) : Nils Perchenek

It is certified that error appears in the above-indentified patent and that said Letters Patent is hereby corrected as shown below:

Title page,
In the References Cited section [56], U.S. PATENT DOCUMENTS subsection, the following references should be added.

| | | | |
|---|---|---|---|
| 4,119,469 | 10/1978 | Carbonnel et al. | 501/80 |
| 4,156,614 | 5/1979 | Greskovich et al. | 501/80 |
| 5,006,490 | 4/1991 | Logan et al. | 501/155 |
| 5,141,900 | 8/1992 | Logan | 501/80 |

Signed and Sealed this

Twenty-sixth Day of November 1996

Attest:

BRUCE LEHMAN

*Attesting Officer*　　　　*Commissioner of Patents and Trademarks*